United States Patent
Fujimura

(10) Patent No.: US 8,456,436 B2
(45) Date of Patent: Jun. 4, 2013

(54) INPUT DEVICE AND INPUT METHOD

(75) Inventor: Kazuya Fujimura, Nara (JP)

(73) Assignee: Panasonic Corporation, Osaka (JP)

( * ) Notice: Subject to any disclaimer, the term of this patent is extended or adjusted under 35 U.S.C. 154(b) by 717 days.

(21) Appl. No.: 12/713,699

(22) Filed: Feb. 26, 2010

(65) Prior Publication Data

US 2010/0225602 A1    Sep. 9, 2010

(30) Foreign Application Priority Data

Mar. 4, 2009    (JP) .................................. 2009-051149

(51) Int. Cl.
*G09G 5/00*    (2006.01)

(52) U.S. Cl.
USPC .................... 345/173; 178/18.03; 715/864

(58) Field of Classification Search
USPC ..... 345/173–177; 178/18.03–18.07; 715/863, 715/864
See application file for complete search history.

(56) References Cited

U.S. PATENT DOCUMENTS

| | | | |
|---|---|---|---|
| 4,653,107 A | 3/1987 | Shojima et al. | |
| 5,517,578 A | 5/1996 | Altman et al. | |
| 5,748,779 A | 5/1998 | Sakaguchi | |
| 5,877,750 A * | 3/1999 | Hanson | 345/173 |
| 6,255,604 B1 * | 7/2001 | Tokioka et al. | 178/18.01 |
| 6,438,523 B1 * | 8/2002 | Oberteuffer et al. | 704/270 |
| 2002/0067346 A1 * | 6/2002 | Mouton | 345/173 |
| 2005/0168449 A1 * | 8/2005 | Katayose | 345/173 |
| 2005/0264538 A1 * | 12/2005 | Yeh | 345/173 |
| 2006/0007182 A1 | 1/2006 | Sato et al. | |
| 2007/0146320 A1 * | 6/2007 | Kubota | 345/157 |
| 2009/0207154 A1 * | 8/2009 | Chino | 345/175 |
| 2010/0289768 A1 * | 11/2010 | Nakao | 345/173 |

FOREIGN PATENT DOCUMENTS

| | | |
|---|---|---|
| JP | 10-154224 | 6/1998 |
| JP | 11-53100 | 2/1999 |
| JP | 2001-100902 | 4/2001 |
| JP | 2003-208259 | 7/2003 |
| JP | 2006-11679 | 1/2006 |

OTHER PUBLICATIONS

Full Machine Translation (in English language) of JP 2003-208259 previously cited in an IDS filed on Feb. 26, 2010, Jul. 2003.

* cited by examiner

*Primary Examiner* — Tom Sheng
(74) *Attorney, Agent, or Firm* — Wenderoth, Lind & Ponack, L.L.P.

(57) ABSTRACT

An input-mode determination unit determines an input mode to be a graphic mode in the case where the number of sets of coordinates included in a coordinate sequence stored in the coordinate-sequence storage unit is smaller than a predetermined number and points represented by the coordinates are within a predetermined distance range, and otherwise, determines the input mode to be a curve mode. A line-to-draw sequence generation unit generates a line-to-draw sequence according to the input mode which the input-mode determination unit has determined to be.

9 Claims, 6 Drawing Sheets

FIG. 6 n = 6

|  | Xi | Yi |
|---|---|---|
| Coordinate set 1 | 150 | 200 |
| Coordinate set 2 | 152 | 201 |
| Coordinate set 3 | 156 | 206 |
| Coordinate set 4 | 159 | 221 |
| Coordinate set 5 | 149 | 230 |
| Coordinate set 6 | 142 | 239 |

FIG. 7 m = 5

|  | Ai | Bi | Ci | Di |
|---|---|---|---|---|
| Line-to-draw 1 | 150 | 200 | 152 | 201 |
| Line-to-draw 2 | 152 | 201 | 156 | 206 |
| Line-to-draw 3 | 156 | 206 | 159 | 221 |
| Line-to-draw 4 | 159 | 221 | 149 | 230 |
| Line-to-draw 5 | 149 | 230 | 142 | 239 |

INPUT DEVICE AND INPUT METHOD

BACKGROUND OF THE INVENTION (1) Field of the Invention

The present invention relates to an input device for performing handwritten input using a touch pad or a digitizer.

(2) Description of the Related Art

Conventionally known handwriting input devices include touch panels and digitizers which are attached to personal computers (PCs). These handwriting input devices allow freehand handwriting input using a finger tip or a stylus. For example, a user draws a picture using graphics software on a PC, by input using a stylus as if the user were writing characters or drawing images on an actual sheet of paper by handwritten input. Furthermore, for example, text is entered through handwritten character recognition by handwriting recognition software running on a PC, where hand-drawn character images are recognized as characters.

FIG. 1 shows appearance of a conventional input device. The conventional handwriting input device includes a PC 901, a digitizer 902, a stylus 903, and a display 904. The digitizer 902 and the display 904 are connected to the PC 901. The stylus 903 is a pen-shaped object for inputting handwritten characters into the digitizer 902. FIG. 1 shows that data of a trajectory of handwriting indicated by a dashed line is inputted into the digitizer 902 using the stylus 903, and is then displayed on the display 904.

It is to be noted that the inputting graphic data such as data of a completely straight line in the device shown in FIG. 1 is difficult because the data is based on handwritten data inputted freehand. FIG. 2 shows an exemplary conventional method of switching menu items on a conventional input device. The conventional exemplary method shown in FIG. 2 allows selection of menu items from a menu 905 displayed on the display 904 using the stylus 903. In other words, a user has to explicitly make a selection for switching input modes in the method. FIG. 3 shows a method of drawing a straight line in graphic mode. FIG. 3 shows an exemplary conventional method of drawing a straight line on a conventional input device. An operation of causing the stylus 903 to come into an instant contact with the digitizer 902 and immediately pulling away the stylus 903 from the digitizer 902, is hereinafter referred to as a tap or tapping. First, a user selects the graphic mode from the menu 905 by tapping. In graphic mode, the user inputs a start point and an end point of a straight line on graphics software running on the PC 901 by tapping twice, tapping once for each of the points, with the stylus 903 on an input surface of the digitizer 902. As a result, the graphics software draws a straight line which connects the start point and the end point. In order to draw a curve, the user selects the curve mode from the menu 905 by tapping on the menu item "Curve" with the stylus 903 to switch to the curve mode, in which a curve is drawn on the display 904 according to a trajectory of the stylus 903 as shown in FIG. 1.

However, there is a problem with the device shown in FIG. 1 that the device requires a user to explicitly switch modes, causing unavoidable laborious operations of the user and complex control of the device. Patent Reference 1 (Japanese Unexamined Patent Application Publication No. 2001-100902) discloses a device which allows a user to draw graphics without explicitly switching modes.

However, the device disclosed in Patent Reference 1 determines one of reference graphic patterns as a desired graphic pattern from a trajectory of input. The device replaces the trajectory with one of the reference graphic patterns when the trajectory falls within an effective scope calculated from the reference graphic patterns. In this case, a trajectory within an effective scope of a reference graphic patter is forcibly replaced with the reference graphic pattern even when the replacement is not necessary.

SUMMARY OF THE INVENTION

The present invention has an object of providing an input device which allows users to draw graphics true to intention of the users with a simple system configuration.

In order to solve the problem, the input device according to the present invention is an input device which switches between input modes according to an external input and includes: >a coordinate input unit configured to identify input positions as the external input using coordinates, the input positions each being detected in response to proximity of an object to or pressure on an input surface defined by a two-dimensional coordinate system; a coordinate-sequence storage unit configured to store, in a coordinate sequence including one or more sets of coordinates which represent coordinate points, one or more of the input positions identified by the coordinate input unit within a predetermined time; and an input-mode determination unit configured to switch the input device to a geometric-figure input mode in the case where the number of the sets of coordinates included in the coordinate sequence is smaller than a predetermined number and the coordinate points are within a predetermined distance range, the geometric-figure input mode being a mode which allows inputting a ready-made geometric figure.

The input device according to the present invention may include: a start-point coordinate storage unit configured to calculate, from the one or more sets of coordinates included in the coordinate sequence, coordinates of a start point for drawing the ready-made geometric figure; and a line-to-draw sequence generation unit configured to draw the ready-made geometric figure in the case where the coordinate input unit obtains a new coordinate sequence when the input device is in the geometric-figure input mode which allows inputting a ready-made geometric figure, the ready-made geometric figure being drawn based on the coordinates of the start point and one or more sets of coordinates included in the new coordinate sequence.

Furthermore, in the input device according to the present invention, the line-to-draw sequence generation unit may be configured to calculate coordinates of an end point and draw a straight line in the case where the number of the sets of coordinates included in the new coordinate sequence is smaller than a predetermined number and coordinate points represented by the sets of coordinates included in the new coordinate sequence are within a predetermined distance range, the straight line being drawn based on the coordinates of the start point and the coordinates of the end point.

Furthermore, in the input device according to the present invention, the input-mode determination unit may be configured to calculate average coordinates from the one or more sets of coordinates included in the coordinate sequence stored in the coordinate-sequence storage unit, and determine the average coordinates as the coordinates of the start point.

Furthermore, in the input device according to the present invention, the input-mode determination unit may be configured to calculate medians of the one or more sets of coordinates included in the coordinate sequence stored in the coordinate-sequence storage unit, and determine the calculated medians as the coordinates of the start point.

Furthermore, in the input device according to the present invention, the line-to-draw sequence generation unit may be configured to calculate representative coordinates and draw a circle having the start point at a center of the circle and a point represented by the representative coordinates on a circumference of the circle in the case where the number of the sets of coordinates included in the new coordinate sequence are equal to or greater than a predetermined number or coordinate points represented by the sets of coordinates included in the new coordinate sequence are out of a predetermined range.

Furthermore, in the input device according to the present invention, when information stored in a current-input-mode information storage unit indicates that the input device is in a geometric-figure input mode, the input-mode determination unit may be configured to determine whether or not the new coordinate sequence obtained by the coordinate input unit is in response to an input by tapping, and, in the case where the new coordinate sequence obtained by the coordinate input unit is not in response to an input by tapping, determine to switch the input device to a geometric-figure input mode which allows inputting an ellipsis having the start point represented by the coordinates stored in the start-point coordinate storage unit at a focus of the ellipsis, and calculate, based on the coordinates included in the new coordinate sequence, two sets of coordinates which represent two points to be on a circumference of the ellipsis, and the line-to-draw sequence generation unit may be configured to generate a line-to-draw sequence which indicates the ellipsis having the start point represented by the coordinates stored in the start-point coordinate storage unit at the focus and the two points represented by the two sets of coordinates calculated by the input-mode determination unit on the circumference of the ellipsis.

In the present invention, the input device is set to a graphic mode in the case where a coordinate sequence inputted includes coordinate points less than a predetermined number and the coordinate points are within a predetermined distance range, and the graphic mode allows drawing completely straight line or a true circle. Thus, the present invention has an advantageous effect that a user is allowed to draw a graphic figure according to the user's intention in a mode to which the user has explicitly switched to. The present invention has another advantageous effect that users can switch input modes without making a laborious selection of menu items as involved in the conventional techniques.

The present invention is implemented not only as a device but also as a method including units which constitute the device as steps, as a program which causes a computer to execute the steps, a computer-readable recording medium such as a CD-ROM on which the program is recorded, or information, data, or a signal which indicates the program. The program, the information, the data, and the signal may be distributed via a communication network, such as the Internet.

FURTHER INFORMATION ABOUT TECHNICAL BACKGROUND TO THIS APPLICATION

The disclosure of Japanese Patent Application No. 2009-051149 filed on Mar. 4, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 shows an exemplary coordinate sequence stored in a coordinate-sequence storage unit shown in FIG. 5; and FIG. 7 shows an exemplary coordinate sequence of a line-to-draw sequence stored in the coordinate-sequence storage unit shown in FIG. 5.

DESCRIPTION OF THE PREFERRED EMBODIMENT

Figure 1:
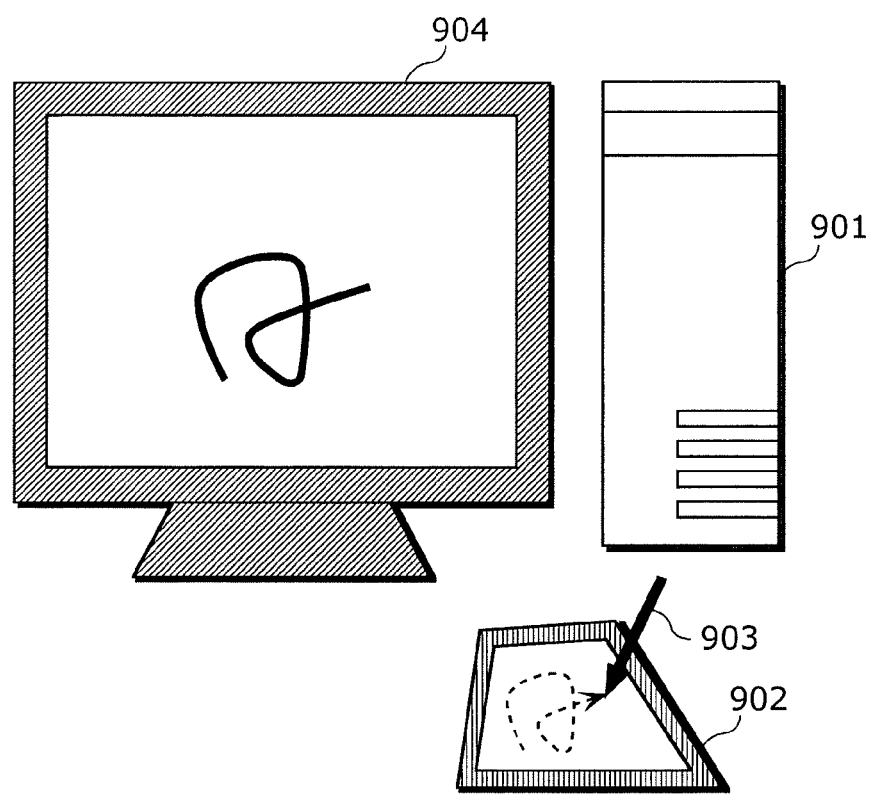
FIG. 1 shows appearance of a conventional input device.
Figure 2:
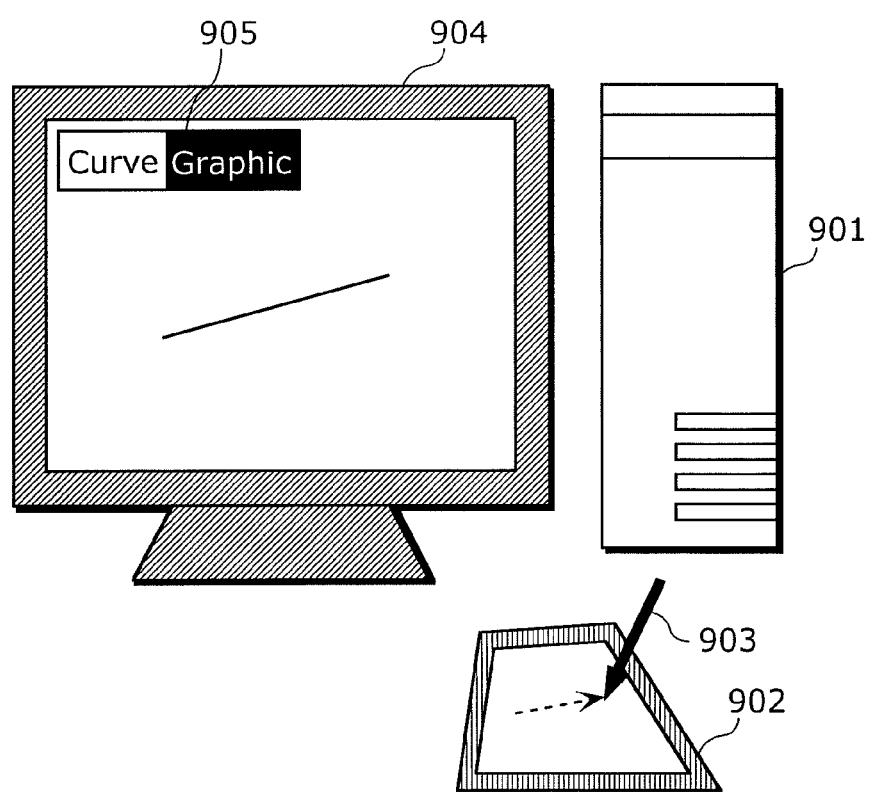
FIG. 2 shows an exemplary conventional method of switching menu items on a conventional input device.
Figure 3:
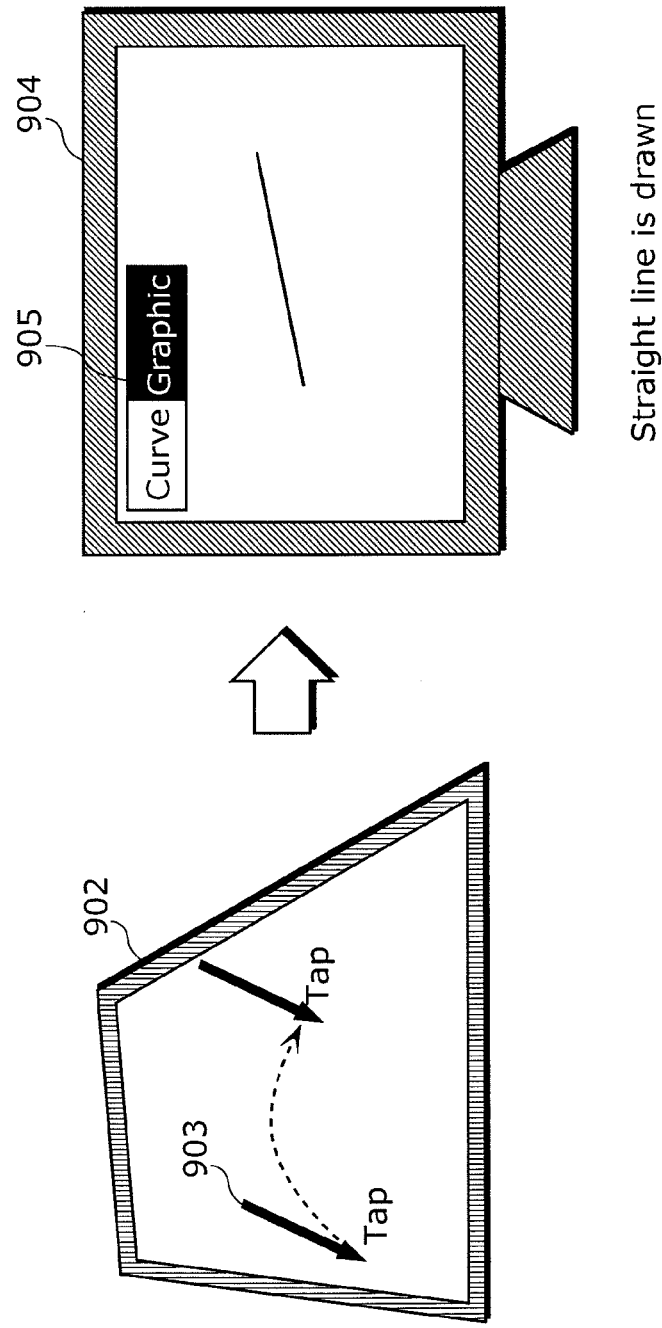
FIG. 3 shows an exemplary conventional method of drawing a straight line on a conventional input device.
Figure 4A:
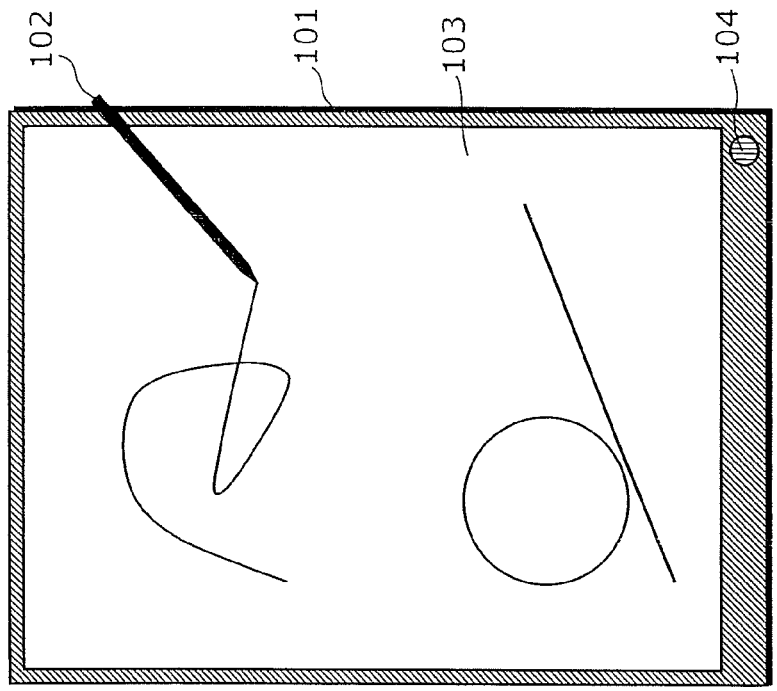
FIG. 4A and FIG. 4B show appearance of the input device according to an embodiment of the present invention.
Figure 4B:
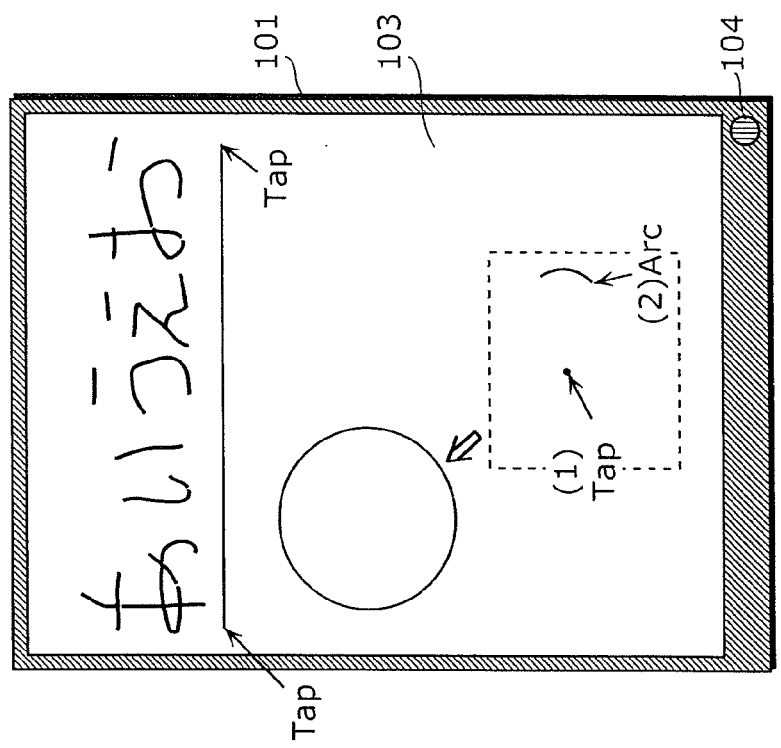

An input device according to the present embodiment is an input device which has a function of switching input modes from curve mode to graphic mode according to tapping on a screen by a user with a stylus, and performs a calculation using coordinates of a point on which a tap has been made as coordinates of a point included in a graphic figure or a point of an element (for example, a circle center) of a graphic figure to be inputted in graphic mode. FIG. 4A and FIG. 4B are appearance diagrams of the input device according to the embodiment of the present invention. As shown in FIG. 4A and FIG. 4B, a handwriting input device 100 includes an input device enclosure 101, a stylus 102, a screen 103, and a power switch 104. When a user traces along the screen 103 using the stylus 102, in other words, slides the stylus 102 while keeping it in contact with or close to the screen 103, the screen 103 detects a trajectory of the stylus 102 on the screen 103 and displays a graphic figure according to the trajectory.

FIG. 4A shows a specific example that, when a user traces characters such as "あいうえお" on the screen 103 using the stylus 102, the screen 103 detects trajectories along the traced characters and displays the trajectories on the screen 103. FIG. 4B shows a curve drawn in an upper part of the input device. The curve is a trajectory of the stylus 102 along the screen 103.

On the other hand, FIG. 4A also shows an exemplary case where the user traces an underline under the string of "あいうえお". The user makes a tap on a start point of the underline to trace, and then another tap on an end point of the underline. As a result, a straight line connecting the start point and the end point on which the taps are made is drawn. The underline under the string of "あいうえお" with no distortion is thereby drawn.

FIG. 4A also shows another exemplary case in a lower part of the input device enclosed by a dashed-line. When a user first makes a tap on a point on the screen 103, and then inputs an arc which is to be part of a circumference to trace, the input device 100 draws a circle which has the point where the tap has been made at a center of the circle and a circumference on which a point calculated from a coordinate sequence of the inputted arc is. In FIG. 4A, the drawn circle is shifted from the positions of the tap and the arc for clarity. The graphic figures in a lower part of FIG. 4B are drawn in the same manner. The user causes the circle to be drawn by making a tap on a point to be a center of the circle and inputting an arc to be part of a circumference of the circle. The user causes a line segment to be drawn under the circle in FIG. 4B by making a tap on a point to be a first end of the line segment and a tap on a point to be a second end of the line segment.

Figure 5:
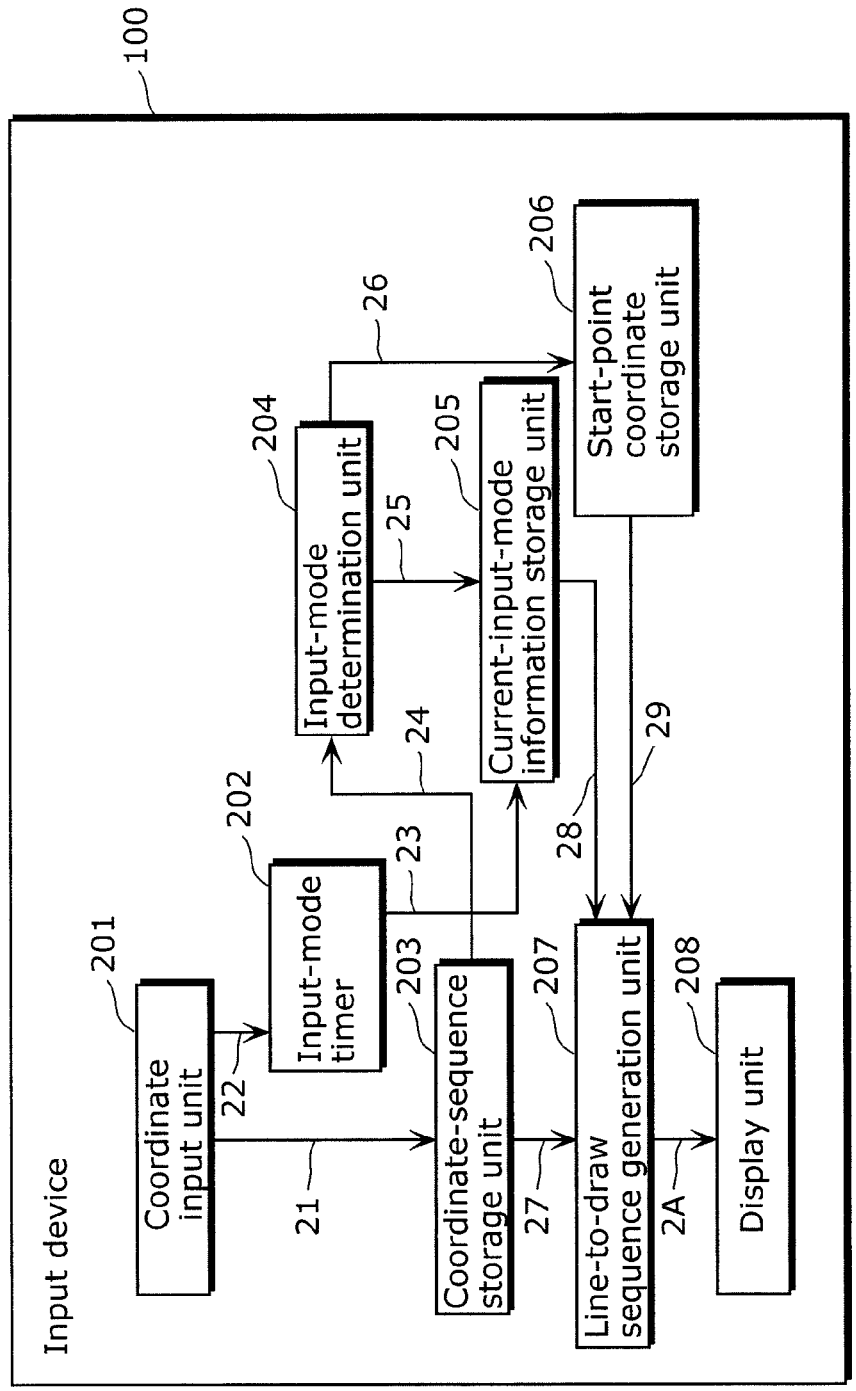
FIG. 5 is a block diagram showing components of the input device according to the embodiment of the present invention.

FIG. 5 is a block diagram showing components of the input device 100 according to the embodiment of the present invention. The input device 100 includes a coordinate input unit 201, an input-mode timer 202, a coordinate-sequence storage unit 203, an input-mode determination unit 204, a current-input-mode information storage unit 205, a start-point coordinate storage unit 206, a line-to-draw sequence generation unit 207, and a display unit 208. The coordinate input unit 201 provides, to the coordinate-sequence storage unit 203, a coordinate sequence 21 which is obtained by regularly sampling coordinate points of the trajectory which the user has made by tracking along the screen 103 with the stylus 102. The coordinate input unit 201 provides an input-start trigger 22 to the input-mode timer 202 on detecting proximity of the stylus to or pressure on the screen 103, thereby activating the input-mode timer 202. Upon receiving the input-start trigger 22 from the coordinate input unit 201, the input-mode timer 202 measures lapse time from the provision of the coordinate sequence 21. The coordinate-sequence storage unit 203 stores the coordinate sequence 21 provided from the coordinate input unit 201. The input-mode determination unit 204 determines an input mode based on a coordinate sequence 24 stored in the coordinate-sequence storage unit 203. The current-input-mode information storage unit 205 stores information that the input device 100 is in the curve mode when the input device 100 is set to initial settings (for example, factory settings or power-up settings). Subsequently, the current-input-mode information storage unit 205 stores information which indicates an input mode 25, which is determined by the input-mode determination unit 204, and also stores information which indicates an input mode 23 and is provided from the input-mode timer 202 when the time measured by the input-mode timer 202 reaches a predetermined length. The start-point coordinate storage unit 206 stores start-point coordinates 26 which the input-mode determination unit 204 has calculated based on the coordinate sequence 24 received from the coordinate-sequence storage unit 203. The line-to-draw sequence generation unit 207 generates a line-to-draw sequence 2A based on a coordinate sequence 27 stored in the coordinate-sequence storage unit 203 and according to an input mode 28 indicated in the information stored in the current-input-mode information storage unit 205 and a start-point coordinates 29 stored in the start-point coordinate storage unit 206. The display unit 208 displays the line-to-draw sequence 2A generated by the line-to-draw sequence generation unit 207.

FIG. 6 shows an exemplary coordinate sequence stored in the coordinate-sequence storage unit 203 shown in FIG. 5. In other words, FIG. 6 shows an example of the coordinate sequence 21 provided from the coordinate input unit 201. In FIG. 6, "n=6" means that the coordinate sequence 21 includes n sets, that is, six sets of XY coordinates sampled on the inputted trajectory. The coordinate input unit 201 includes, for example, the stylus 102 and the screen 103 shown in FIG. 4A and FIG. 4B, and detects coordinates of contact points between the stylus 102 and the screen 103 at intervals of a predetermined time while the stylus 102 and the screen 103 are in contact, thereby obtaining the coordinate sequence 21. The coordinate input unit 201 provides the coordinate sequence 21, which indicates a sequence of points inputted by the user, in the format shown in FIG. 6 to the coordinate-sequence storage unit 203. The coordinate-sequence storage unit 203 stores the coordinate sequence 21 without changing the format. Furthermore, when the user starts the inputting, the coordinate input unit 201 provides the input-start trigger 22 to the input-mode timer 202 to activate the input-mode timer 202. The input-mode timer 202 resets its own internal timer upon receiving the input-start trigger 22. The input-mode timer 202 changes the input mode indicated in the information stored in the current-input-mode information storage unit 205 to the curve mode when a predetermined time has elapsed since the resetting. This allows the user to return to the curve mode by pausing for a short time to make a next input even in the case of unintentional change of the input mode to the graphic mode or in the case of change of decision after purposefully switching to the graphic mode. The input-mode determination unit 204 determines an input mode using the coordinate sequence 24 stored in the coordinate-sequence storage unit 203. The following is a method of determining the input mode.

Average coordinates (Xa, Ya) of the coordinates (Xi, Yi) which are included in the coordinate sequence 24 are calculated using EQ. 1 below:

[Math. 1]

$$(Xa, Ya) = \left( \frac{\sum_{i=1}^{n} Xi}{n}, \frac{\sum_{i=1}^{n} Yi}{n} \right), \quad \text{(EQ. 1)}$$

where $1 \leq i \leq n$ (n is the number of sets of the coordinates). Here, in the case where n is smaller than a predetermined number N and i satisfies $1 \leq i \leq n$, the input mode is determined to be the graphic mode when EQ. 2 below is satisfied:

[Math. 2]

$$\sqrt{(Xa-Xi)^2 + (Ya-Yi)^2} < L \quad \text{(EQ. 2)},$$

where L is a predetermined distance range. The input-mode determination unit 204 then changes the input mode indicated in the information stored in the current-input-mode information storage unit 205 to the graphic mode. The predetermined number N is set to an optimum value according to a sampling rate of the screen 103 based on, for example, a simulation result. The predetermined distance range L is set to an optimum value according to resolution of the screen 103 based on, for example, a simulation result. Here, when the conditions are satisfied that the number of the sets of the coordinates included in the coordinate sequence 24 is smaller than the predetermined number and that distances between a reference coordinate point and points represented by respective sets of the coordinates, which is the point represented by the average coordinates of the coordinate sequence 24, are shorter than the predetermined distance range L, the coordinate sequence 24, that is, the coordinate sequence 21 provided from the coordinate input unit 201 is a coordinate sequence inputted by tapping. When the input-mode determination unit 204 determines that the provided coordinate sequence is inputted by tapping, the input-mode determination unit 204 determines the input mode to be the graphic mode. Furthermore, the input-mode determination unit 204 transmits the average coordinates (Xa, Ya) as start-point coordinates 26 to the start-point coordinate storage unit 206. The start-point coordinate storage unit 206 stores the start-point coordinates 26. The line-to-draw sequence generation unit 207 receives the coordinate sequence 27 from the coordinate-sequence storage unit 203, and then generates the line-to-draw sequence 2A according to the input mode 28 indicated in the information stored in the current-input-mode information storage unit 205 and the start-point coordinates 29 stored in the start-point coordinate storage unit 206. The line-to-draw sequence generation unit 207 generates the line-to-draw sequence 2A using the method described below. The coordinate sequence 24 and the coordinate sequence 27 is each identical to the coordinate sequence 21 stored in the coordinate-sequence storage unit 203.

In the case where the input mode 28 is the curve mode, the line-to-draw sequence 2A generated by the line-to-draw sequence generation unit 207 includes line segments which sequentially connect points represented by the coordinates included in the coordinate sequence 27. FIG. 7 shows an exemplary coordinate sequence of a line-to-draw sequence stored in the coordinate-sequence storage unit 203 shown in FIG. 5. In other words, FIG. 7 shows a line-to-draw sequence which is generated by the line-to-draw sequence generation unit 207 and represented in coordinates. Specifically, a line-to-draw (Ai, Bi, Ci, Di) which represents connection of points represented by coordinates (Ai, Bi) and (Ci, Di) as shown in FIG. 7, is represented using the coordinate sequence (Xi, Yi) as follows:

[Math. 3]

$$(A_i, B_i, C_i, D_i) = (X_i, Y_i, X_{i+1}, Y_{i+1}) \quad (EQ. 3),$$

where i satisfies $1 \leq i \leq n-1$ and the number of lines-to-draw included in the line-to-draw sequence m is equal to n−1.

In the case where the input mode 28 indicates the graphic mode, the average coordinates (Xa, Ya) of the coordinate sequence (Xi, Yi) are calculated using EQ. 1 to use them as end-point coordinates, and the lines-to-draw are represented as follows using the end-point coordinates (Xa, Ya) and the start-point coordinates (Xo, Yo) stored in the start-point coordinate storage unit 206:

[Math. 4]

$$(A_1, B_1, C_1, D_1) = (X_o, Y_o, X_a, Y_a) \quad (EQ. 4).$$

Here, the number of lines-to-draw included in the line-to-draw sequence is one. In other words, in the case where the input mode 28 is the graphic mode, the line-to-draw sequence 2A generated by the line-to-draw sequence generation unit 207 indicates a line segment which connects the point represented by the start-point coordinates (Xo, Yo) stored in the start-point coordinate storage unit 206 and the point represented by the average coordinates (Xa, Ya) of the coordinate sequence (Xi, Yi).

The display unit 208 receives the line-to-draw sequence 2A and sequentially displays lines-to-draw.

The predetermined number N and the predetermined distance range L, which the input-mode determination unit 204 uses in order to determine the input mode 28, may be changed by the user as necessary.

In the description above, the input-mode determination unit 204 determines whether or not the coordinate sequence 24 is within the predetermined distance range by determining whether or not the distances between the reference coordinate point, which is the point represented by the average coordinates of the coordinate sequence 24, and the points represented by respective sets of the coordinates of the coordinate sequence 24 are shorter than the predetermined distance range. Alternatively, whether or not the coordinate sequence 24 is within the predetermined distance range may be determined using a different method. For example, the reference coordinate point may be a point represented by the first set of the coordinates included in the coordinate sequence 24.

In the description above, the information stored in the current-input-mode information storage unit 205 indicates the curve mode when the input device 100 is in initial settings. Alternatively, the information may indicate the graphic mode.

In the description above, the start-point coordinates 26 calculated based on the coordinate sequence 24 are transmitted from the input-mode determination unit 204 to the start-point coordinate storage unit 206 in the description above. Alternatively, the coordinate-sequence storage unit 203 may transmit start-point coordinates calculated based on the coordinate sequence 21 to the start-point coordinate storage unit 206.

In the description above, the input-mode determination unit 204 sets the input mode to the graphic mode when the number of the sets of the coordinates included in the coordinate sequence 24 is smaller than the predetermined number and the coordinate points represented by the sets of the coordinates are within the predetermined distance range. Alternatively, the input mode may be set to the graphic mode when the number of the sets of the coordinates is smaller than a predetermined number or when the coordinate points represented by the sets of the coordinates are within a predetermined distance range.

The line-to-draw sequence generation unit 207 may transmit the end-point coordinates obtained by calculation to the start-point coordinate storage unit 206 after the line segment connecting the points indicated by the start-point coordinates 29 and the end-point coordinates is drawn, and causes the start-point coordinate storage unit 206 to store the end-point coordinates as next start-point coordinates. This allows drawing a graphic figure which is obtained by sequentially connecting points inputted by taps with line segments.

In the description above, the input-mode determination unit 204 transmits, to the start-point coordinate storage unit 206, the average coordinates of the coordinates included in the coordinate sequence 24 as the start-point coordinates 26. Start-point coordinates may be obtained by methods other than obtaining averages of coordinates. For example, a start-point coordinate may be a median which is the middle number of coordinates arranged in ascending or descending order, or an average of coordinates except minimum and maximum ones.

In the description above, the line-to-draw sequence generation unit 207 generates the line-to-draw sequence 2A so as to provide a line segment connecting the points represented by the start-point coordinates 29 stored in the start-point coordinate storage unit 206 and the end-point coordinates which is the average coordinates of the coordinate sequence 27 when the input mode is the graphic mode. Such end-point coordinates may be obtained by methods other than obtaining averages of coordinates. For example, an end-point coordinate may be a median which is the middle number of coordinates arranged in ascending or descending order, or an average of coordinates except minimum and maximum ones.

The predetermined time to be measured by the input-mode timer 202 until the input-mode timer 202 changes the input mode indicated in the information stored in the current-input-mode information storage unit 205 to the curve mode, may be changed by a user as necessary.

In the description above, the input-mode timer 202 changes the input mode indicated in the information stored in the current-input-mode information storage unit 205 to the curve mode. Alternatively, the input mode may be changed to the curve mode by methods other than this. For example, the input device may be additionally provided with a mode-reset button which allows a user to set the input mode to the curve mode by pressing the mode-reset button.

The input device may be further provided with an electric-sound emitting unit or a light-emitting unit to inform a user that the modes have been changed. For example, a user is informed of such a change by an electric sound emitted by the emitted or light emitted by the light-emitting unit when the input-mode timer changes the input mode indicated in the information stored in the current-input-mode information storage unit 205 to the curve mode.

The above describes a method of drawing a straight line when the input mode is changed to the graphic mode upon a tap which is followed by a tap for input. The following describes an example of drawing in the case where the input mode is changed to the graphic mode upon a tap which is followed by input of a curve.

In the case where the input mode 28 is the graphic mode, the line-to-draw sequence generation unit 207 calculates average coordinates (Xa, Ya) of a newly inputted coordinate sequence (Xi, Yi) using EQ. 1. In the case where EQ. 2 is satisfied for n, i, and L when n is smaller than a predetermined number N, i satisfies 1≦i≦n, and L is a predetermined distance range, the line-to-draw sequence generation unit 207 determines that a user instructs to draw a straight line, calculates average coordinates (Xa, Ya) of a coordinate sequence (Xi, Yi) using EQ. 1 to obtain end-point coordinates, and generates a line to draw represented by EQ. 5 below using the end-point coordinates and start-point coordinates 29 which are start-point coordinates (Xo, Yo) stored in the start-point coordinate storage unit 206.

[Math. 5]

$$(A_1, B_1, C_1, D_1) = (X_o, Y_o, X_a, Y_a) \quad \text{EQ. 5}$$

In the case where n is equal to or greater than a predetermined number N or where the coordinate sequence (Xi, Yi) does not satisfy EQ. 2 for i, which satisfies 1≦i≦n, and L, which is a predetermined distance range, the line-to-draw sequence generation unit 207 determines that a user instructs to draw a circle, and generates a line-to-draw sequence 2A which indicates a circle determined by the coordinate sequence (Xi, Yi) and having the start-point coordinates (Xo, Yo) stored in the start-point coordinate storage unit 206 at a center.

An exemplary circle determined by the coordinate sequence (Xi, Yi) is a circle having a start point represented by the start-point coordinates (Xo, Yo) stored in the start-point coordinate storage unit 206 at a center of the circle and a reference point represented by reference coordinates obtained using the coordinate sequence (Xi, Yi) on a circumference of the circle. The reference coordinates may be, for example, average coordinates of the coordinate sequence calculated using EQ. 1 or, alternatively, may be simply the first set of the coordinates included in the coordinate sequence. When the average coordinates (Xa, Ya) are used as the reference coordinates, the line-to-draw sequence (Ai, Bi, Ci, Di) of a circle having the point (Xo, Yo) at the center thereof and the point (Xa, Ya) on a circumference thereof is represented by EQ. 6 below:

[Math. 6]

$$(A_i, B_i, C_i, D_i) = \begin{pmatrix} R\sin 2\pi \frac{i-1}{n}, R\cos 2\pi \frac{i-1}{n}, \\ R\sin 2\pi \frac{i}{n}, R\cos 2\pi \frac{i}{n} \end{pmatrix},$$

where $R = \sqrt{(Xo-Xa)^2 + (Yo-Ya)^2}$, 1≦i≦n, and n is the number of the lines-to-draw.

In the description above, the line-to-draw sequence generation unit 207 generates the line-to-draw sequence of the circle which has the point represented by the reference coordinates obtained using the coordinate sequence 27 on the circumference thereof. Alternatively, the line-to-draw sequence generation unit 207 may generate a line-to-draw sequence which indicates a circle having the start-point coordinates 29 stored in the start-point coordinate storage unit 206 at a center determined of the circle and two points determined by two sets of reference coordinates calculated from the coordinate sequence 27 on a circumference of the circle. In this case, the reference coordinates may be calculated so that a distance between a line to draw which is indicated by a line-to-draw sequence obtained by sequentially connecting points represented by the coordinate sequence 27 in the curve mode and a circumference on which the two points represented by two sets of reference coordinates are.

Alternatively, the line-to-draw sequence generation unit 207 may generate a line-to-draw sequence which indicates an ellipse having the start-point coordinates 29 stored in the start-point coordinate storage unit 206 at one focus of the ellipse and two points represented by two sets of reference coordinates obtained using the coordinate sequence 27 on a circumference of the ellipse. Again, the focus other than the one at which the start-point coordinates is and two sets of the reference coordinates may be calculated so that a distance between a line-to-draw which is drawn in the curve mode according to a line-to-draw sequence obtained from the coordinate sequence 27 and a corresponding part of a circumference which is calculated from the coordinate sequence 27 in the graphic mode.

Each of the functional blocks shown in the block diagram (see FIG. 5) is typically implemented as a large-scale integration (LSI) circuit, which is an integrated circuit. These functional blocks may be integrated into a separate single chip, or some or all of the functional blocks may be integrated into a single chip. All the functional blocks other than a memory block may be integrated into a single chip.

Although the integrated circuit is here referred to as an LSI, it may be referred to as an IC, a system LSI, a super LSI or an ultra LSI, depending on the degree of integration.

The method of forming integrated circuitry is not limited to use of LSIs. Dedicated circuitry or a general-purpose processor may be used instead of LSIs. Also applicable is a field programmable gate array (FPGA), which allows post-manufacture programming, or a reconfigurable processor LSI, which allows post-manufacture reconfiguration of connection and setting of circuit cells therein.

Furthermore, in the event that an advance in or derivation from semiconductor technology brings about an integrated circuitry technology whereby an LSI is replaced, the functional blocks may be obviously integrated using such new technology. The adaptation of biotechnology or the like is possible.

Among the functional blocks, only a unit for storing data to be coded or decoded may be excluded from integration into a single chip and configured otherwise.

Although only one exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The input device according to the present invention is beneficially applicable to devices, such as electronic organizers, in which users electrically input data of curves (characteristics) and graphics (geometric figures) using a stylus while frequently switching between them.

What is claimed is:

1. An input device which switches between input modes according to an external input, said input device comprising:
   a coordinate input unit configured to identify input positions as the external input using coordinates, the input positions each being detected in response to proximity of an object to or pressure on an input surface defined by a two-dimensional coordinate system;
   a coordinate-sequence storage unit configured to store, in a coordinate sequence including one or more sets of coordinates which represent coordinate points, one or more of the input positions identified by said coordinate input unit within a predetermined time; and
   an input-mode determination unit configured to switch said input device to a geometric-figure input mode in the case where the number of the sets of coordinates included in the coordinate sequence is smaller than a predetermined number and the coordinate points are within a predetermined distance range, the geometric-figure input mode being a mode which allows inputting a ready-made geometric figure.

2. The input device according to claim 1, comprising:
   a start-point coordinate storage unit configured to calculate, from the one or more sets of coordinates included in the coordinate sequence, coordinates of a start point for drawing the ready-made geometric figure; and
   a line-to-draw sequence generation unit configured to draw the ready-made geometric figure in the case where said coordinate input unit obtains a new coordinate sequence when said input device is in the geometric-figure input mode which allows inputting a ready-made geometric figure, the ready-made geometric figure being drawn based on the coordinates of the start point and one or more sets of coordinates included in the new coordinate sequence.

3. The input device according to claim 2,
   wherein said line-to-draw sequence generation unit is configured to calculate coordinates of an end point and draw a straight line in the case where the number of the sets of coordinates included in the new coordinate sequence is smaller than a predetermined number and coordinate points represented by the sets of coordinates included in the new coordinate sequence are within a predetermined distance range, the straight line being drawn based on the coordinates of the start point and the coordinates of the end point.

4. The input device according to claim 2,
   wherein said input-mode determination unit is configured to calculate average coordinates from the one or more sets of coordinates included in the coordinate sequence stored in said coordinate-sequence storage unit, and determine the average coordinates as the coordinates of the start point.

5. The input device according to claim 2,
   wherein said input-mode determination unit is configured to calculate medians of the one or more sets of coordinates included in the coordinate sequence stored in said coordinate-sequence storage unit, and determine the calculated medians as the coordinates of the start point.

6. The input device according to claim 2,
   wherein said line-to-draw sequence generation unit is configured to calculate representative coordinates and draw a circle having the start point at a center of the circle and a point represented by the representative coordinates on a circumference of the circle in the case where the number of the sets of coordinates included in the new coordinate sequence are equal to or greater than a predetermined number or coordinate points represented by the sets of coordinates included in the new coordinate sequence are out of a predetermined range.

7. The input device according to claim 2,
   wherein, when information stored in a current-input-mode information storage unit indicates that said input device is in a geometric-figure input mode, said input-mode determination unit is configured to determine whether or not the new coordinate sequence obtained by said coordinate input unit is in response to an input by tapping, and, in the case where the new coordinate sequence obtained by said coordinate input unit is not in response to an input by tapping, determine to switch said input device to a geometric-figure input mode which allows inputting an ellipsis having the start point represented by the coordinates stored in said start-point coordinate storage unit at a focus of the ellipsis, and calculate, based on the coordinates included in the new coordinate sequence, two sets of coordinates which represent two points to be on a circumference of the ellipsis, and
   said line-to-draw sequence generation unit is configured to generate a line-to-draw sequence which indicates the ellipsis having the start point represented by the coordinates stored in the start-point coordinate storage unit at the focus and the two points represented by the two sets of coordinates calculated by said input-mode determination unit on the circumference of the ellipsis.

8. The input device according to claim 7, further comprising
   an input-mode timer which measures time,
   wherein said coordinate input unit is configured to reset said input-mode timer when an input of a coordinate sequence is completed, and, when a predetermined time has elapsed since the resetting, said input-mode timer switches the geometric-figure input mode indicated by the information stored in said current-input-mode information storage unit back to an input mode which the information indicated immediately before the geometric-figure input mode which allows inputting a ready-made geometric figure.

9. A method of receiving an external input used in an input device switching between input modes according to the external input, the input device including a coordinate input unit, a coordinate-sequence storage unit, and an input-mode determination unit, said method comprising:
   identifying, using the coordinate input unit, input positions as the external input using coordinates, the input positions detected in response to proximity of an object to or pressure on an input surface defined by a two-dimensional coordinate system;
   storing, in a coordinate sequence including one or more sets of coordinates which represent coordinate points, one or more of the input positions identified in said identifying within a predetermined time, the coordinate sequence being stored in the coordinate-sequence storage unit; and
   switching, using the input-mode determination unit, the input device to a geometric-figure input mode in the case where the number of the sets of coordinates included in the coordinate sequence is smaller than a predetermined number and the coordinate points are within a predetermined distance range, the geometric-figure input mode being a mode which allows inputting a ready-made geometric figure.

* * * * *